H. Watson
INVENTOR

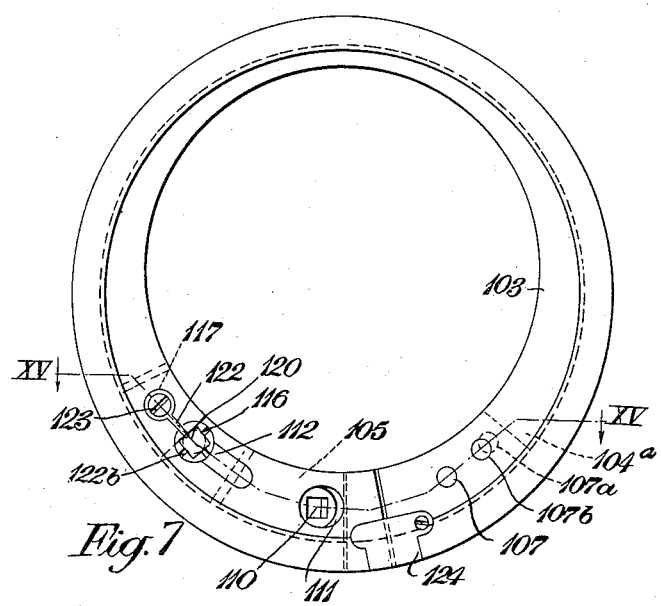
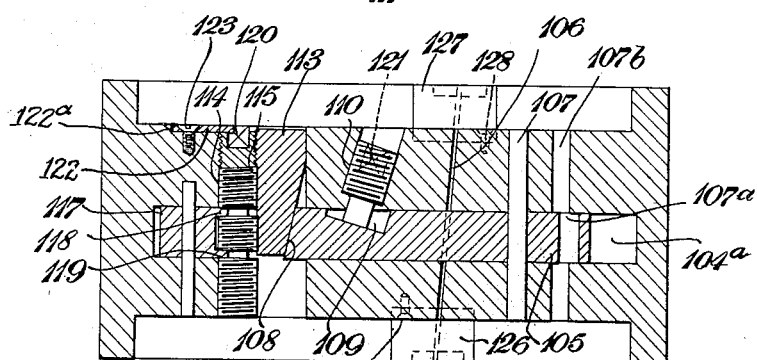

Patented July 4, 1933

1,916,451

UNITED STATES PATENT OFFICE

HENRY WATSON, OF HIGHWALLS, DINAS POWYS, WALES

SEALING DEVICE

Application filed March 26, 1931, Serial No. 525,543, and in Great Britain November 10, 1930.

This invention relates to sealing devices and particularly to piston rings and metallic packings for use in steam or internal combustion engines, vacuum pumps, hydraulic pumps and the like and particularly to piston rings and metallic packings of the kind in which the thickness of the material forming the ring is considerably in excess of the thickness of the material used in the usual spring rings employed, for instance, in connection with automobile engines.

With rings of the type to which the invention relates, it is undesirable to rely upon the natural spring of the ring to secure a satisfactory joint between the piston with which it is associated and the cylinder in which the piston operates because the pressure which they would exert on the walls of the cylinder if their "spring" were relied on to secure a fluid-tight joint would result in excessive or unequal wear of the ring and of the cylinder.

The object of the present invention is to provide improved sealing devices, piston rings or packings of the character above indicated.

The invention consists in a packing ring for pistons having a split therein comprising a bridge piece extending across the split, means permanently engaging the bridge piece with the material of the ring on one side of the split, adjustable means associated with the material of the ring on the other side of the split, adapted to enter into locking engagement with an adjacent portion of the bridge piece, and means adapted to be actuated to cause relative movement between the two ends of the ring forming the sides of the split and thus to adjust the peripheral dimension of the ring.

For instance, in accordance with the invention in the interior or exterior surface of the ring there may be provided a recess or recesses in which is housed a bridge piece or pieces connected with the adjacent portions of the ring by means, preferably, capable of adjustment to secure or permit an increase or decrease in the effective diameter of the ring.

One end of the bridge piece may, for example, be connected with the ring by means of a pin or the like which is a snug fit in a hole provided in the bridge piece and similar holes provided in the adjacent portion of the ring, while the other end of the bridge piece is secured to the portion of the ring on the other side of the split by means adapted to be released to permit movement between the bridge piece and the adjacent portion of the ring for the purpose of adjustment of the effective diameter thereof and thereafter to be locked or secured to prevent such motion.

For instance, in accordance with the invention, one end of the bridge piece may be secured with the portion of the ring on one side of the split by a pin, while the other end is provided with a slot through which passes a screw, the head of which may be so formed as to be engaged by a key employed for releasing or securing engagement between the bridge piece and the ring.

A wide variety of other means may be employed for effecting connection between the bridge piece and the ring. For instance, the bridge piece may be connected thereto by set screws engaged in holes in one or both faces of the ring and entering a recess in the inner surface thereof adapted to form a housing for the bridge piece.

For increasing the effective diameter of the ring any suitable adjusting means may be provided for instance an element in the form of or functioning as a wedge or cam.

In some cases, for instance, a screw member having a conical point, which is adapted to be forced between two adjacent surfaces, in order to increase the distance between them, may be used.

Alternatively, a cam adapted to be rotated by means of a key or the like may be provided for the purpose of adjustment.

In one construction in accordance with the invention a member in the form of a wedge is used, the wedge being provided with a screw-threaded portion adapted to engage a screw which may be rotated in order to move the wedge in a direction parallel with the axis of the screw, and thus to cause the inclined surface of the wedge to be moved relatively to a similarly inclined surface in expanding or contracting the ring.

Further, in accordance with the invention, screw-actuated mechanism or its equivalent, may be employed in various other ways, for instance, as a turnbuckle or the like for effecting adjustment of the diameter of the ring.

The invention will be described further in detail and by way of example with reference to the accompanying drawings in which, Figure 1 is a view in elevation of one face of one construction, Figure 2 is a view in elevation of the opposite face of the construction illustrated in Figure 1, Figure 3 is a distorted view of a section taken along the lines III—III of Figure 1, Figure 4 is a view in elevation of one face of a second construction, Figure 5 is a view in elevation of the opposite face of the construction illustrated in Figure 4, Figure 6 is a distorted view of a section taken along the lines VI—VI of Figure 4;

Figure 7 is a view in elevation of one face of a sixth construction, while

Figure 8 is a distorted view of a section taken along the lines VIII—VIII of Figure 7.

Figure 1:
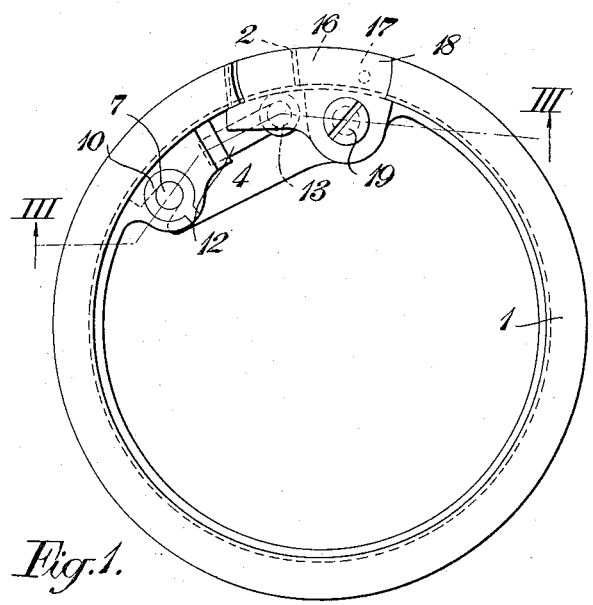
Figure 2:
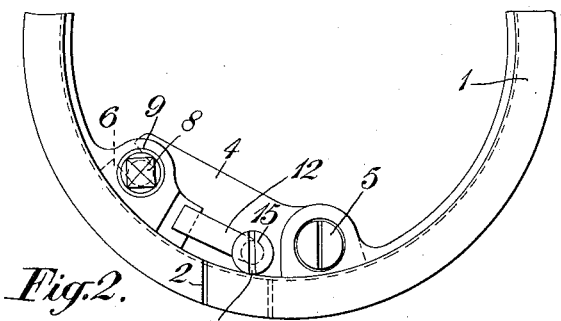
Figure 3:
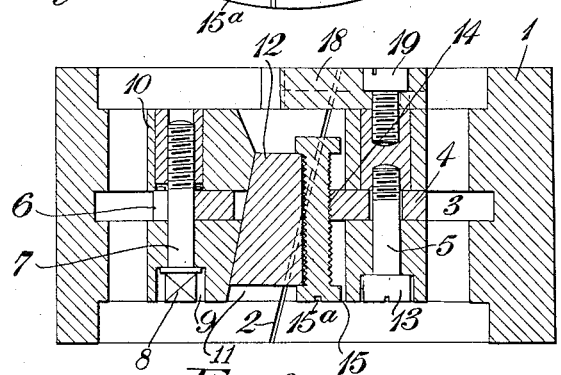

In the construction illustrated in Figures 1, 2 and 3 a ring 1 formed of cast iron is provided with a split 2, and on its inner surface with a groove 3 the depth of which increases towards that portion of the ring adjacent to the split 2.

In the deeper portion of the recess there is housed a bridge piece 4 secured to the ring on one side of the split by means of a pin 5 and in the opposite end of the bridge piece there is provided an elongated slot 6 through which passes a screw 7 provided with a squared portion 8 at one end so that it may be engaged by a key, the portion in question being housed in a recess 9 formed in one face of the ring and the other end of the screw engaging an internally screw threaded sleeve 10 coaxial with the recess and located on that portion of the ring below the bridge piece, while between the head of the screw and the bridge piece there may be provided, if necessary, a spring washer to ensure that when the screw is tightened down the bridge piece will be locked with the ring.

In the vicinity of the split 2 there is also formed a recess 11 in which is housed a wedge shaped member 12 adapted to be moved in a direction parallel with the axis of the ring by means of a screw 13 engaging therewith and with the screw-threaded portion 14 of the bridge piece, the head 15 of the screw being accessible from one face of the ring, and provided with a slot 15a with which may be engaged a screw driver or like tool for the purpose of rotating the screw.

Further, on opposite sides of the split there are provided recesses 16, 17 in which is engaged the tongue 18 formed of bronze or the like metal extending across the split and adapted to prevent leakage of steam or other fluid through the split when the ring is in position, the tongue being secured to the ring by means of the pin 19.

In order to adjust the diameter of the ring, the screw 7 is first slackened by rotation of a key engaging with the squared portion 8, the screw 13 is then rotated in the manner above indicated in order to move the wedge shaped member 12 and thereby to widen or narrow the split 2 and hence to increase or decrease the diameter of the ring and the screw 7 is then tightened up in order to lock the ring in its adjusted position.

Figure 4:
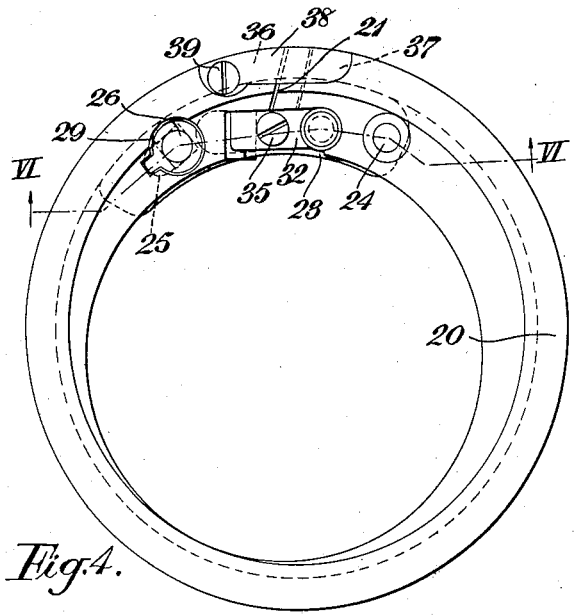
Figure 5:
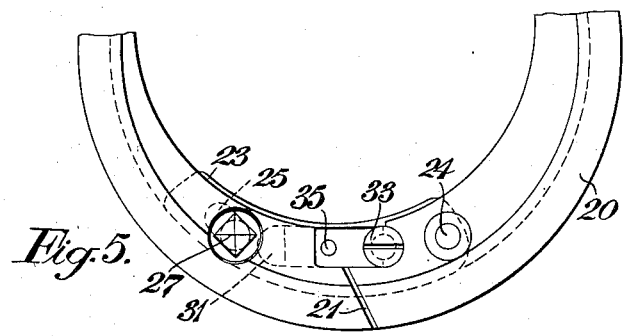
Figure 6:
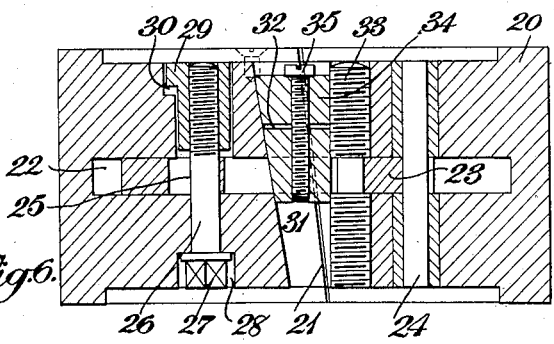

In the construction illustrated in Figures 4, 5 and 6 the ring 20 is provided with an inclined split 21 and a recess 22 on its inner face in which is engaged a bridge piece 23 of such length that it extends from a point on one side of the split to a suitable point of the ring on the other side of the split, one end of the bridge piece being anchored to the body of the ring by a pin 24 while the other end of the bridge piece is provided with a slot 25 forming a clearance for a screw 26 provided with a squared portion 27 at one end so that it may be engaged by a key, the portion in question being housed in a recess 28 in the ring, and the other end of the screw engaging an internally screw-threaded sleeve 29 secured from rotation but easily slidable within the hole 30 in such manner that rotation of the screw relatively to the sleeve in one direction will force the sleeve into engagement with the bridge piece in order to secure the retention of the ring in the position or state into which it has been adjusted.

In the vicinity of the split 21 there is also formed a recess 31 in which is housed the wedge shaped member 32 adapted to be moved in a direction parallel with the axis of the ring by means of the screw 33 engaging with the screw-threaded portion 34 of the wedge shaped member, the latter being formed of two portions secured together by means of the screw 35. The lowermost portion is adapted to function as a locknut and the object of this arrangement is to enable the two portions when pressed together by the action of the screw to lock the wedge with the screw.

As in the construction previously described the ring is provided with recessed portions 36, 37 in which is engaged the tongue 38 secured to the ring by means of the pin 39 and adapted to prevent leakage of the working fluid past the split in the ring.

Adjustment of the ring is effected by first slackening the screw 26, and then adjusting and locking the ring in a manner precisely similar to the manner of adjusting the construction illustrated in Figures 1, 2 and 3.

In the construction illustrated in Figures 7 and 8, the ring is provided with a recess 104a on its inner face, in which there is engaged a bridge piece 105 which is of such length that it extends from a point adjacent to one side of the split 106 to a point adjacent to the other side of the split, and one end of the bridge piece is anchored to the body of the ring by means of a pin 107, while the other end of the bridge piece is provided at its extremity with an inclined face 108, and adjacent to this, an inclined elongated recess 109 which is engaged with a screw 110 housed in a recess 111 in the ring. The bridge piece and ring are also provided with holes 107a—107b respectively, adapted to engage a pin such as the pin 107 in order to provide means for securing a greater degree of expansion of the ring than is possible with the pin 107 in the position shown.

In the body of the ring adjacent to the inclined face 108 in the bridge piece there is also formed a recess 112, in which is housed the wedge shaped member 113 adapted to contact with the inclined face 108 of the bridge piece and to be moved in a direction parallel with the axis of the ring by means of the screw 114 engaging with the screw threaded portion 115 of the wedge shaped member, and the screw 114 housed in a recess 116 in the ring is held in position and provided with means adapted to resist vertical thrust in both directions by the anchor plate member 117 engaging with peripheral recesses 118—119 provided in the screw 114.

The anchor plate member is housed in the same recess 104 as the bridge piece 105, and is held in a fixed position by means of the pin 120a which passes through the anchor plate member and adjacent portions of the body of the ring.

The screws 110 and 114 are provided respectfully with squared recesses 120—121 adapted to engage a correspondingly formed key member in order to provide means for rotation thereof, and in the case of the screw 114 a tongued locking plate member 122 is provided adjacent to the said screw and is housed in a recess 122a in the body of the ring, within which it is secured by means of the screw 123, four castellations 122b being provided in the end of the screw 114 to house the tongue of the plate member 122.

As in the case of the constructions previously described, the ring is provided with recessed portions 124, 125, in which are engaged the tongue pieces 126, 127 secured to the ring by means of the pins 128, 129, the purpose of these tongue pieces being, as previously indicated, to prevent leakage of the working fluid past the split in the ring.

The ring is adjusted by first slackening the screw 110, removing the locking plate member 122, and then adjusting the ring in a manner precisely similar to the manner of adjusting the construction illustrated in Figures 4, 5 and 6. The ring is finally locked in this adjusted position by tightening the screw 110 and replacing and securing the locking plate member 122 and the screw 123.

As will be seen a ring in accordance with the invention is of such character that its effective diameter is positively adjusted to secure a determined clearance between the ring and the walls of the valve chamber or piston chamber in which it is to operate by increasing or diminishing the width of a split or splits formed in the ring.

Rings in accordance with the invention may be formed of any desirable material, for instance, cast iron, steel, bronze, vulcanite, wood, leather, compressed paper or the like.

It will, further, be appreciated that rings in accordance with the invention are adapted to be used not only in the working chamber of an engine but also in the valve chests thereof in the case of engines having piston valves or for pump and hydraulic pistons, air pump buckets, etc.

Having now described my invention, what I claim as new and desire to secure by Letters Patent is:—

1. A packing ring for pistons having a split therein, comprising a bridge piece extending across the split, means permanently engaging the bridge piece with the material of the ring on one side of the split, adjustable means associated with the material of the ring on the other side of the split, adapted to enter into locking engagement with an adjacent portion of the bridge piece, and means adapted to be actuated to cause relative movement between the two ends of the ring forming the sides of the split and thus to adjust the peripheral dimension of the ring.

2. A packing for pistons comprising a ring having a split therein, a bridge piece extending across the split, means permanently engaging the bridge piece with the material of the ring on one side of the split, means located in the material of the ring on the other side of the split, adapted releasably to be secured in locking engagement with the adjacent portion of the bridge piece, and means in the vicinity of the split capable of movement to increase or decrease the dimension of the ring.

3. A packing for pistons comprising a ring having a split extending from one end face of the ring to the opposite end face thereof, a bridge piece extending across the split, a pivotal connection between the material of the ring on one side of the split and the bridge piece, locking means associated with the material of the ring on the other side of the split, adapted releasably to engage the bridge piece at a point remote from the aforesaid pivotal connection, and means located adjacent to the split adapted to be moved in a direction parallel with the axis of the ring to cause relative movement between the two ends of the ring forming the sides of the split.

4. A packing for pistons comprising a ring having a split therein, a bridge piece extending across the split, a pin extending through the material of the ring on one side of the split and through one end of the bridge piece, means located in the material of the ring on the other side of the split, adapted releasably to secure the other end of the bridge piece in locking engagement with the adjacent portions of the ring, and means in the vicinity of the split capable of movement to increase or decrease the dimension of the ring.

5. A packing for pistons comprising a ring having a split therein, a bridge piece extending across the split, a pin extending through the material of the ring on one side of the split and through one end of the bridge piece, a screw passing through the material of the ring on the other side of the split, adapted to be tightened down to lock the other end of the bridge piece to the ring, and means in the vicinity of the split capable of movement to increase or decrease the dimension of the ring.

6. A packing for pistons comprising a ring having a split therein and recesses in the material of the ring upon either side of the split, a bridge piece extending across the split and engaging within the recesses, means permanently engaging the bridge piece with the material of the ring on one side of the split, means located in the material of the ring on the other side of the split, adapted releasably to secure the other end of the bridge piece in locking engagement with the adjacent portions of the ring, and means in the vicinity of the split capable of movement to increase or decrease the dimension of the ring.

7. A packing for pistons comprising a ring having a split therein and recesses in the material of the ring upon either side of the split, a bridge piece extending across the split and engaging within the recesses, a pin passing through the material of the ring on one side of the split and through one end of the bridge piece, means located in the material of the ring on the other side of the split adapted releasably to secure the other end of the bridge piece in locking engagement with the adjacent portions of the ring, and means in the vicinity of the split capable of movement to increase or decrease the dimension of the ring.

8. A packing for pistons comprising a ring having a split therein and recesses in the material of the ring upon either side of the split, a bridge piece extending across the split and engaging within the recesses, a pin passing through the material of the ring on one side of the split and through one end of the bridge piece, a locking screw passing through the material of the ring on the other side of the split and adapted to be tightened down to lock the other end of the bridge piece with the ring, and means in the vicinity of the split capable of movement to increase or decrease the dimension of the ring.

9. A packing for pistons comprising a ring having a split therein, a bridge piece extending across the split and formed in one of its ends with a slot, a pin passing through the material of the ring on one side of the split and through that end of the bridge piece remote from the slot, a locking screw passing through the material of the ring on the other side of the split and through the slot in the bridge piece, said locking screw being adapted to be tightened down to lock that end of the bridge piece within which the slot is formed with the ring, and means in the vicinity of the split capable of movement to increase or decrease the dimension of the ring.

10. A packing for pistons comprising a ring having a split therein and recesses in the material of the ring upon either side of the split, a bridge piece extending across the split and formed in one of its ends with a slot, said bridge piece engaging within the recesses, a pin passing through the material of the ring on one side of the split and through that end of the bridge piece remote from the slot, a locking screw passing through the material of the ring on the other side of the split and through the slot in the bridge piece, said locking screw being adapted to be tightened down to lock that end of the bridge piece within which the slot is formed with the ring, and means in the vicinity of the split capable of movement to increase or decrease the dimension of the ring.

11. A packing for pistons comprising a ring having a split therein, a bridge piece extending across the split and formed in one of its ends with a slot, a pin passing through the material of the ring on one side of the split and through that end of the bridge piece remote from the slot, a locking screw passing through the material of the ring on the other side of the split and through the slot in the bridge piece, said locking screw being adapted to be tightened down to lock that end of the bridge piece within which the slot is formed, with the ring, an inclined surface formed on the material of the ring on one side of the split, a wedge-shaped element slidably engaging against the inclined surface, and an adjusting screw in screw-threaded engagement with the wedge-shaped element, adapted when the locking screw is slackened off to be rotated to cause relative movement between the wedge-shaped element and the inclined surface and thus to cause variations in the dimension of the ring.

12. A packing for pistons comprising a ring having a split therein and recesses in the material of the ring upon either side of the split, a bridge piece extending across the split and formed in one of its ends with a slot, said bridge piece engaging within the recesses, a pin passing through the material of the ring on one side of the split and through that end of the bridge piece remote from the slot, a locking screw passing through the material of the ring on the other side of the split and through the slot in the bridge piece, said locking screw being adapted to be tightened down to lock that end of the bridge piece within which the slot is formed with the ring, an inclined surface formed on the material of the ring on one side of the split, a wedge-shaped element slidably engaging against the inclined surface, and an adjusting screw in screw-threaded engagement with the wedge-shaped element, adapted when the locking screw is slackened off to be rotated to cause relative movement between the wedge-shaped element and the inclined surface and thus to cause variations in the dimension of the ring.

13. A packing for pistons comprising a ring having a split therein and recesses in the material of the ring upon either side of the split, a bridge piece extending across the split and engaging within the recesses, a pin passing through the material of the ring on one side of the split and through one end of the bridge piece, a locking screw inclined at an angle with the axis of the ring and passing through the material of the same on the other side of the split, said locking screw being adapted to be tightened down against the other end of the bridge piece and thus to lock the same with the ring, and means in the vicinity of the split capable of movement to increase or decrease the dimension of the ring.

14. A packing for pistons comprising a ring having a split therein and recesses in the material of the ring upon either side of the split, a bridge piece extending across the split and engaging within the recesses, a pin passing through the material of the ring on one side of the split and through one end of the bridge piece, a locking screw passing through the material of the ring on the other side of the split, said locking screw being adapted to be tightened down to lock the other end of the bridge piece with the ring, an inclined surface formed on the material of the ring on one side of the split, a wedge-shaped element slidably engaging against the inclined surface, and an adjusting screw in screw-threaded engagement with the wedge-shaped element, adapted when the locking screw is slackened off to be rotated to cause relative movement between the wedge-shaped element and the inclined surface and thus to cause variations in the dimension of the ring.

15. A packing for pistons comprising a ring having a split therein and recesses in the material of the ring upon either side of the split, a bridge piece extending across the split and engaging within the recesses, a pin passing through the material of the ring on one side of the split and through one end of the bridge piece, a locking screw inclined at an angle with the axis of the ring and passing through the material of the same on the other side of the split, said locking screw being adapted to be tightened down against the other end of the bridge piece and thus to lock the same with the ring, an inclined surface formed on the material of the ring on one side of the split, a wedge-shaped element slidably engaging against the inclined surface, and an adjusting screw in screw-threaded engagement with the wedge-shaped element, adapted when the locking screw is slackened off to be rotated to cause relative movement between the wedge-shaped element and the inclined surface and thus to cause variations in the dimension of the ring.

16. A packing for pistons comprising a ring having a split therein, a bridge piece extending across the split, means permanently engaging the bridge piece with the material of the ring on one side of the split, means located in the material of the ring on the other side of the split adapted releasably to be secured in locking engagement with the adjacent portion of the bridge piece, an inclined surface formed on the material of the ring on one side of the split, a wedge-shaped element slidably engaging against the inclined surface, and an adjusting screw in screw-threaded engagement with the wedge-shaped element, adapted when the locking screw is slackened off to be rotated to cause relative movement between the wedge-shaped element and the inclined surface and thus to cause variations in the dimension of the ring.

17. A packing for pistons comprising a ring having a split therein, a bridge piece extending across the split, means permanently engaging the bridge piece with the material of the ring on one side of the split, means located in the material of the ring on the other side of the split adapted releasably to be secured in locking engagement with the adjacent portion of the bridge piece, an inclined surface formed on the material of the ring on one side of the split, two wedge-shaped elements slidably engaging against the inclined surface, an adjusting screw in screw-threaded engagement with the wedge-shaped elements, adapted when the locking screw is slackened off to be rotated to cause relative movement between the wedge-shaped elements and the inclined surface and thus to cause variations in the dimension of the ring, and adjustable locking means interconnecting the said two wedge-shaped elements and adapted to be actuated to cause movement of the one relative to the other and thus to lock the same against the adjusting screw.

18. A packing for pistons comprising a ring having a split therein and recesses in the material of the ring upon either side of the split, a bridge piece extending across the split and engaging within the recesses, said bridge piece being formed adjacent to the middle portion thereof with a slot and adjacent to one of its ends with an elongated recess having an inclined face, a pin passing through the material of the ring on one side of the split and through that end of the bridge piece remote from the elongated recess, an inclined locking screw passing through the material of the ring on the other side of the split and engaging against the inclined face in the elongated recess, said locking screw being adapted to be tightened down against the inclined face in order to lock the adjacent end of the bridge piece with the material of the ring, an inclined surface formed on the material of the ring on one side of the split, a wedge-shaped element slidably engaging against the inclined surface and passing through the slot in the bridge piece, an adjusting screw also passing through the slot in the bridge piece and in screw-threaded engagement with the wedge-shaped element, said adjusting screw being adapted when the locking screw is slackened off to be rotated to cause relative movement between the wedge-shaped element and the inclined surface and thus to cause variations in the dimension of the ring, squared recesses in the head of the adjusting screw, and a locking plate member adapted releasably to enter into engagement with the squared recesses so as to lock the adjusting screw against rotation.

In testimony whereof I have signed my name to this specification.

HENRY WATSON.